(12) United States Patent
Fowlow et al.

(10) Patent No.: US 6,189,138 B1
(45) Date of Patent: *Feb. 13, 2001

(54) VISUAL COMPOSITION TOOL FOR CONSTRUCTING APPLICATION PROGRAMS USING DISTRIBUTED OBJECTS ON A DISTRIBUTED OBJECT NETWORK

(75) Inventors: Brad G. Fowlow, Redwood City; Greg B. Nuyens; Frank Ludolph, both of Menlo Park, all of CA (US)

(73) Assignee: Sun Microsystems, Inc., Palo Alto, CA (US)

(*) Notice: Under 35 U.S.C. 154(b), the term of this patent shall be extended for 0 days.

This patent is subject to a terminal disclaimer.

(21) Appl. No.: 09/399,968

(22) Filed: Sep. 21, 1999

Related U.S. Application Data

(63) Continuation of application No. 08/675,850, filed on Jul. 3, 1996, now Pat. No. 5,991,535.

(51) Int. Cl.[7] ........................................... G06F 9/44
(52) U.S. Cl. ................. 717/1; 717/2; 717/3; 717/10; 707/104; 707/103 R; 707/10; 709/332; 345/348; 345/967
(58) Field of Search .................. 717/1, 2, 3, 10; 707/104, 103, 10, 103 R; 709/315, 316, 318, 332; 345/348, 967, 968

(56) References Cited

U.S. PATENT DOCUMENTS

| | | |
|---|---|---|
| 5,163,130 | 11/1992 | Hullot . |
| 5,261,098 | 11/1993 | Katin et al. . |
| 5,339,419 | 8/1994 | Chan et al. . |
| 5,339,433 | 8/1994 | Frid-Nielsen . |
| 5,392,448 | 2/1995 | Frankel et al. . |
| 5,414,806 | 5/1995 | Richards . |
| 5,446,902 | 8/1995 | Islam . |
| 5,450,583 | 9/1995 | Inada . |
| 5,475,817 | 12/1995 | Waldo et al. . |

(List continued on next page.)

OTHER PUBLICATIONS

Summers, et al., Visual Programming Language Bibliography, Nov. 29, 1995, Department of Computer Science from Oregon State Internet Website.

Al–Salqan et al., "MediaWare: A Distributed Multimedia Environment with Interoperability", Apr. 20, 1995, IEEE.

(List continued on next page.)

Primary Examiner—Mark R. Powell
Assistant Examiner—Tuan Q. Dam
(74) Attorney, Agent, or Firm—Beyer Weaver & Thomas, LLP

(57) ABSTRACT

A method, apparatus, and program code visually constructs object-oriented application software to be installed on a distributed object system. The method of the invention includes the following steps. Initially, the method provides a catalog facility which contains components having references to pre-existing objects within a distributed object system. A component is selected from the catalog facility for inclusion in the application software. A part corresponding to the object referenced by the selected component is derived from the selected component. The part is then made available to an application construction environment. In this environment, the part can be linked to at least one other part that also references a pre-existing object in the distributed object system. Graphical facilities are provided within the application construction environment for selecting and defining links among parts. Links define relationships between parts and thereby provide computer code for the application software under construction. When the part is linked to another part in the application construction environment, computer code is generated that will be effective to implement the relationship between the parts when the application program is run.

20 Claims, 11 Drawing Sheets

U.S. PATENT DOCUMENTS

| | | |
|---|---|---|
| 5,524,246 | 6/1996 | Hurley et al. . |
| 5,634,095 | 5/1997 | Wang et al. . |
| 5,642,511 | 6/1997 | Chow et al. . |
| 5,659,735 | 8/1997 | Parrish et al. . |
| 5,671,415 | 9/1997 | Hossain . |
| 5,692,183 | 11/1997 | Hapner et al. . |
| 5,699,735 | 12/1997 | Garloff et al. . |
| 5,721,911 | 2/1998 | Ha et al. . |
| 5,724,589 | 3/1998 | Wold . |
| 5,727,145 | 3/1998 | Nessett et al. . |
| 5,764,989 | 6/1998 | Gustafsson et al. . |
| 5,809,507 * | 9/1998 | Cavanaugh, III .................. 707/103 |
| 5,860,004 * | 1/1999 | Fowlow et al. ......................... 717/1 |
| 5,920,868 * | 7/1999 | Fowlow et al. ..................... 707/103 |
| 5,949,998 * | 9/1999 | Fowlow et al. ......................... 717/1 |
| 5,991,535 * | 11/1999 | Fowlow et al. ......................... 717/2 |
| 6,032,199 * | 2/2000 | Lim et al. .......................... 709/316 |
| 6,044,224 * | 3/2000 | Radia et al. ........................ 717/10 |
| 6,044,409 * | 3/2000 | Lim et al. .......................... 709/315 |

OTHER PUBLICATIONS

Gamma et al., "Design Patterns Elements of Reusable Object–Oriented Software", 1995, Addison–Wesley Professional Computing Series.

Visual Object–Oriented programming Concepts and Environment, Burnett et al. 49–63; 143–145, 1995.

* cited by examiner

VISUAL COMPOSITION TOOL FOR CONSTRUCTING APPLICATION PROGRAMS USING DISTRIBUTED OBJECTS ON A DISTRIBUTED OBJECT NETWORK

This application is a continuation of application Ser. No. 08/675,850 filed Jul. 3, 1996 now U.S. Pat. No. 5,991,535 entitled "VISUAL COMPOSITION TOOL FOR CONSTRUCTING APPLICATION PROGRAMS USING DISTRIBUTED OBJECTS ON A DISTRIBUTED OBJECT NETWORK from which priority under 35 U.S.C. §120 is claimed and the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. The Field of the Invention

The present invention relates to the fields of distributed computing systems, client-server computing and object-oriented programming. More specifically, the present invention includes a method and apparatus for creating object-oriented software applications for use on a distributed object system.

2. The Relevant Art

Object oriented programming methodologies have received increasing attention over the past several years in response to the increasing tendency for software developed using traditional programming methods to be delivered late and over budget. One problem with traditional programming techniques stems from the emphasis placed on procedural models and "linear" code that often is extremely difficult to design and maintain. Generally, large programs created using traditional methods are "brittle", that is, even small changes to isolated elements of the program can affect all elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and/or procedures of the object are relatively isolated from the remainder of the program. This provides code that is more easily maintained as compared to code written using traditional methods, since changes to an object's code do not affect the code in the other objects. In addition, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly.

The object metaphor in distributed systems is a useful technique as it separates the object's interface from its implementation; thus allowing software designers to take advantage of the functionalities of various objects available to them without having to worry about the details of the object's implementation. The programmer need only be aware of the object's interface. In addition, object oriented distributed systems allow for multiple implementations of a single interface, which interface may reside on different computing platforms that have been connected through a network. Thus, a programmer working on one machine of a network may make a call to an object about which the programmer has no detailed knowledge with the confidence that at the appropriate time that the remote object will be accessed and return its data so that the programmer's code will function properly. Such a system thus maximizes the inherent advantages of object oriented methodologies by taking full advantage of their modularity and encapsulation.

Attempts to provide such facilities have been made using object oriented distributed systems that are based upon a client-server model, in which object-servers provide interfaces to clients that make requests of the object-servers. Typically in such systems, these servers are objects consisting of data and associated methods. The clients obtain access to the functionalities of the object-servers by executing calls on them, which calls are mediated by the distributed system. When the object-server receives the call it executes the appropriate method and transmits the result back to the object-client. The client and object-server communicate through an Object Request Broker (ORB) which is used to locate the various distributed objects and establish communications therebetween.

Although the advantages to employing object oriented programming methodologies through distributed object systems are significant, there remain major hurdles to their implementation. In general, the goal of implementing the reuse of software during the programming process, even in the context of object programming, is difficult to achieve. Typically, programmers are reluctant to use code about which their understanding is minimal or even nonexistent. This is compounded in distributed object systems as the developer(s) of the code may not be easily reached to provide comments and instruction to the programmer whose task is to develop a new application. Thus, although much useful code may be available to the programmer throughout the distributed object system that programmer may not be able to take full advantage of it, thus being forced to rewrite sections of code that have already been developed.

In addition, the entire process of coding vary large programs is extremely difficult. Programmers must be able to analyze huge amount of complex programming code in order to produce a working application. Object programming poses special challenges in this regard as programmers must be aware of the inheritance structures that the objects of the application contain. Thus, in the development of large object-oriented applications the programmer must become aware of the interrelationships among the objects in the program, which awareness is made more difficult by the large amounts of textual material that must be absorbed and analyzed.

The full promise of object oriented methodologies, especially the advantages afforded by their modularity, have yet to be achieved. In particular, it would be highly desirable to allow programmers and other users the ability to create and install distributed objects in a relatively transparent fashion so that objects created in different programming languages and/or objects residing on different computing platforms can be made available on distributed object systems without extensive re-invention of existing programming code, or placing an undue burden on the user. In addition, distributed object programming would be facilitated by methods and designs that simplify the design and analysis of object relationships in an application. Solutions to both of these problems would facilitate the development of object oriented applications and distributed object applications, by allowing the programmer to focus on the tasks that required real creative effort and minimized repetitive coding and analysis.

SUMMARY OF THE INVENTION

The present invention provides methods, apparatus, and computer-readable media for constructing and installing distributed objects on a distributed object network in a relatively intuitive and transparent fashion that facilitates the reuse of computer code already available on the distributed object system. Using the methods, apparatus, and computer-readable media of the present invention, the construction, design, and analysis of distributed object software is greatly facilitated as will become apparent upon considering the Disclosure and Drawings hereinbelow.

In one aspect, the present invention provides a computer-implemented method for constructing object-oriented application software to be installed on a distributed object system, in which the object-oriented application software includes an application program interface and at least one pre-existing object or derivative of a pre-existing object. In one embodiment, the method of the invention comprises the steps of providing a catalog facility which contains components that provide references to pre-existing objects provided on a distributed object system. From the catalog facility, a component is selected for inclusion in the application software and a part corresponding to the object referenced by the selected component is derived from the selected component. The part is then made available to an application construction environment in which the part can be linked to at least one other part referencing a pre-exising object in the distributed object system using facilities for selecting and defining links among the parts to define relationships thereamong to provide thereby computer code for the object-oriented application software. Finally, the part is linked to at least one other part in the application construction environment to define thereby a relationship among the parts such that computer code effective to implement the relationship is generated when the application program is run.

In one embodiment, the references to the pre-existing objects comprise icons, the catalog and application construction environment comprise graphical user interfaces, and the step of selecting includes making a selection action on one of the icons. In another embodiment, the step of making a reference to the pre-existing object available to the application construction environment comprises dragging the reference to from the catalog facility to the application construction facility. In still another embodiment, each of the parts each comprises plugs and sockets and the step of linking comprises defining a connection between a plug on a first part and a socket on a second part. In yet another embodiment, the catalog facility includes regions for viewing the icons and information regarding the pre-existing objects represented by the icons, and the step of selecting a component is effective to cause the display of information relating to the pre-existing object referred to by the selected component.

In another aspect, the present invention provides a computer system for constructing under computer control object-oriented application software to be installed on a distributed object system. In one embodiment, the system of the invention comprises a component service which includes a catalog of references to pre-exisitng objects installed on the distributed object system. The component service is coupled with a composition builder for generating compositions using the references. The composition builder provides an application construction environment including facilities for selecting and defining links among the references in which the references can be linked to define relationships to provide computer code for the object-oriented application software. A code generation unit for generating and compiling source code from the composition to produce thereby program source files is also provided. The code generator is further coupled with an object development facility which processes the program source files generated by the code generation unit to produce software objects for installation on the distributed object system.

In one embodiment, the composition builder comprises a composition workspace in which parts can be selected and linked, an interface editor for editing computer code defining the interface of a pre-existing object, a browser for selecting files to be edited, and a summary table for defining information about the object being referenced by the part. In another embodiment, the composition workspace, interface editor, browser, and summary table each comprise a graphical user interface. In still another embodiment, the application construction environment includes a graphical user interface for displaying, selecting, and linking parts, a region for displaying and selecting the plugs of a selected part, a region for displaying and selecting the sockets of a selected part, a region for displaying the interface of the application being constructed, a region for references to the interfaces of pre-existng objects, and a region for setting attribute values of selected parts.

In yet another aspect, the present invention includes a computer program product for constructing object-oriented application software to be installed on a distributed object system, which object-oriented application software includes an application program interface and at least one pre-existing object or derivative of a pre-existing object. In one embodiment, the computer program product comprising computer readable program code devices for providing a catalog facility which contains references to pre-existing objects provided on a distributed object system. The computer program product further includes program code devices for providing an application construction environment in which the references can be linked to define relationships thereamong to provide thereby computer code for the object-oriented application software, in which the application construction environment including facilities for selecting and defining links among the references. Also included are program code devices for selecting a reference for inclusion in the application software from the catalog facility and making the reference to the pre-existing object available to the application construction environment. Furthermore, the computer program product includes additional code devices for linking the reference to at least one other reference in the application construction environment to define thereby a relationship between the references such that computer code effective to implement the relationship is generated when the application program is run.

These, and other aspects and advantages of the present invention, will become more apparent with the Detailed Description below is read in conjunction with the accompanying Drawings.

DESCRIPTION OF SPECIFIC EMBODIMENTS

Figure 1:
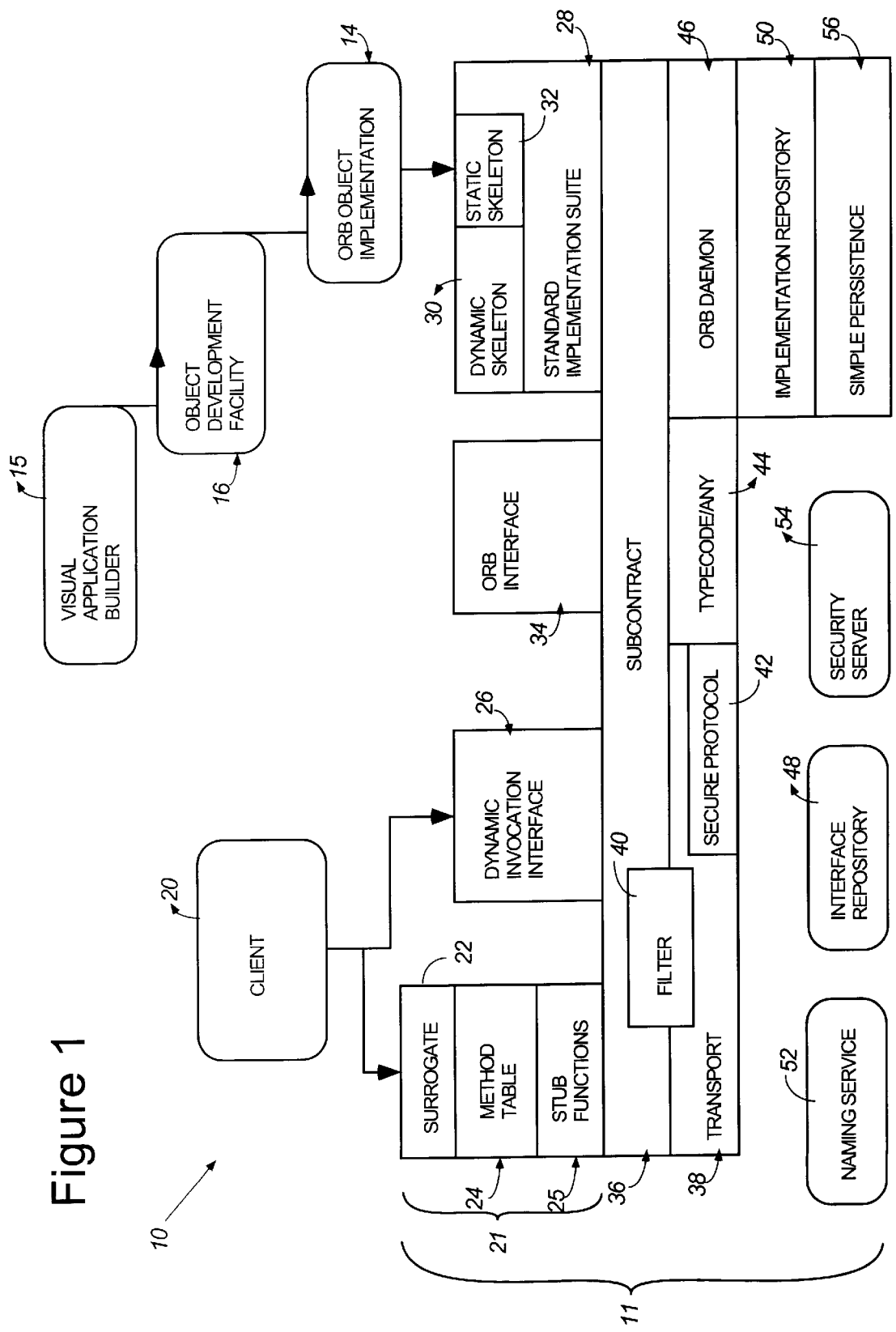
FIG. 1 is a schematic illustration of an object request broker (ORB) in accordance with the present invention.

1. Physical Embodiments and Background of Distributed Object Systems

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media which include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

A distributed object system 10 typically includes an Object Request Broker (ORB) 11 as is symbolically illustrated in FIG. 1. ORB 11 provides location and transport mechanisms and facilities necessary to deliver a call from a client to a servant (target object) and to return a response to the client. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, the distributed object may be a C++ object that has been provided by an application developer. Alternatively, an implementation for a distributed object may be developed within a visual application builder 15 as described in greater detail in Section 2 below. In brief, the visual application builder allows a developer to visually select existing object types from a catalog of object types available on the distributed object system and graphically connect the services provided by the selected objects to create a new implementation for an object.

An object development facility 16 may be used to simplify the creation and the installation of distributed objects, in part, by "wrapping" or encapsulating developer objects in distributed object code as described in co-pending U.S. patent application Ser. No. 08/414,240, which is incorporated herein by reference for all purposes. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility 16 in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the servant object. Alternatively, client 20 may communicate directly with the servant object through a dynamic invocation interface (DII) 26 instead of through surrogate 22, method table 24 and stub functions 25. Dynamic invocation interface 26 is used to enable clients to construct dynamic requests.

Subcontract layer 36 provides the functionality required by an object in order to utilize subcontracts to implement various services (or features or object mechanisms) named by a particular subcontract, as described in greater detail in above-referenced U.S. patent application Ser. No. 08/554,794, filed Nov. 7, 1995, and incorporated herein by reference for all purposes. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in above-referenced U.S. patent application Ser. No. 08/670,682 incorporated herein by reference for all purposes. Filter 40, if being used, may perform a variety of tasks, such as compression, encryption, tracing, or debugging, that are to be applied to communications to and from an object.

Transport layer 38 operates to marshal, unmarshal and physically transport information to and from a servant that typically does not share the same process as a client. Mechanisms for marshaling and unmarshaling inter-object communications are described in above-referenced U.S. patent application Ser. No. 08/673,181. A technique for marshaling/unmarshaling an object reference is described in above-referenced U.S. patent application Ser. No. 08/670,681.

A standard implementation suite 28 (or object adapter) represents a set of subcontracts that interact with ORB objects 14 in identical ways, as for example object key management. One such implementation suite is described in above-referenced U.S. patent application Ser. No. 08/669,782. It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object 78. Thus, skeletons 30 and 32 call an appropriate servant object 78. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter. An ORB daemon 46 is responsible for ensuring that object servers are active when invoked by clients. A technique for starting object servers is disclosed in U.S. patent application Ser. No. 08/408,645 which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between processes on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. Such a technique is disclosed in U.S. patent application Ser. No. 08/677,013, which is incorporated herein by reference. A naming service 52 is used to name ORB objects. A client may use naming service 52 to find a desired object by name. Naming service 52 returns an object reference, that in turn may be used to send requests to that object. An Interface Repository 48 (IFR) knows about all interfaces for all objects within the distributed object system.

Figure 2:
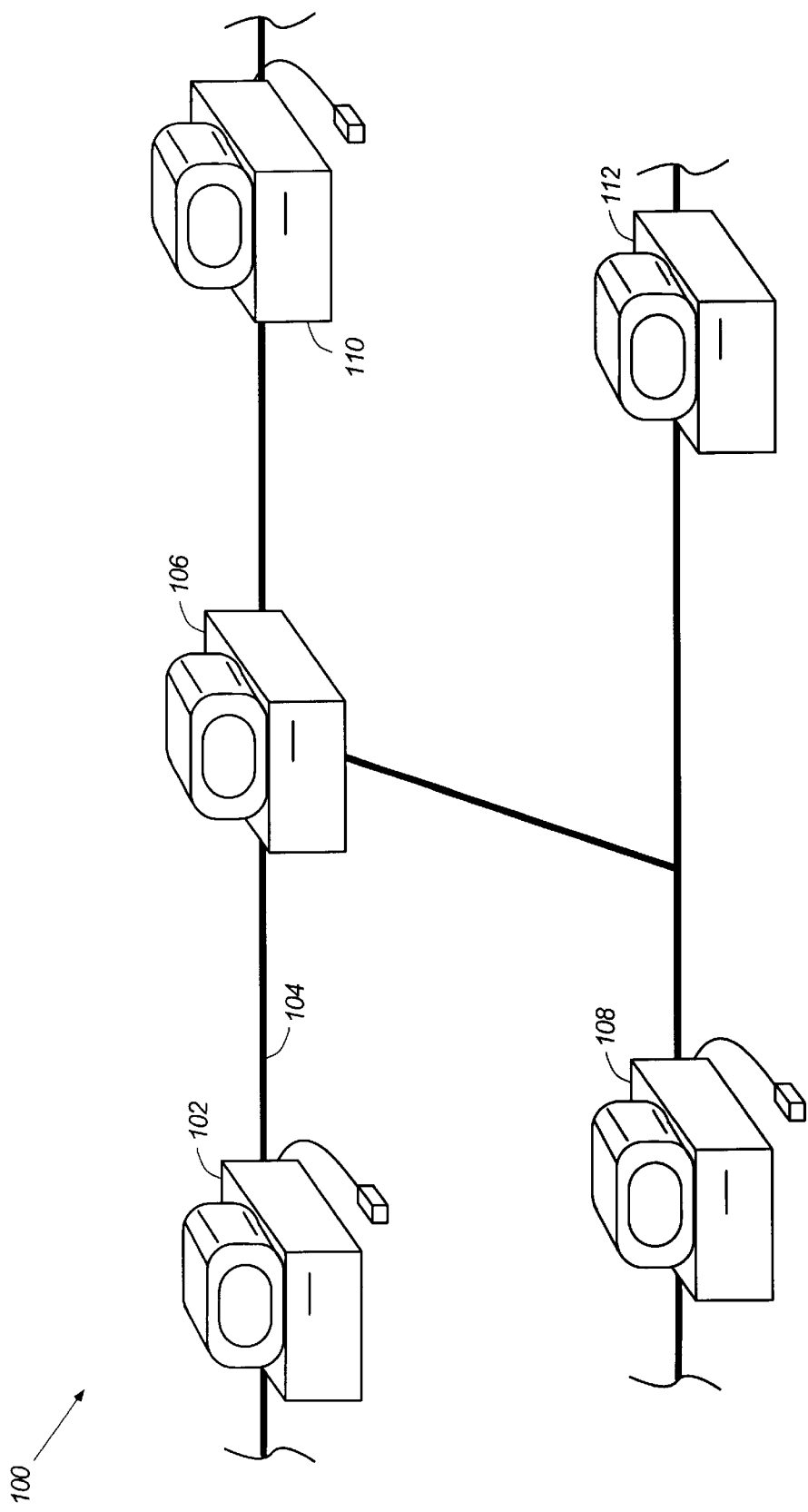
FIG. 2 is an illustration of a computer network in accordance with the present invention.

In an embodiment of the present invention, distributed objects are located on one or more computers linked together by a computer network such as the network illustrated at 100 in FIG. 2. As seen in the Figure, network 100 includes computer 102 which computer is coupled to a network 104. Network 104 can further include a server, router or the like 106 in addition to other computers 108, 110, and 112 such that data and instructions can be passed among the networked computers. The design, construction and implementation of computer networks will be familiar to those of skill in the art.

Figure 3:
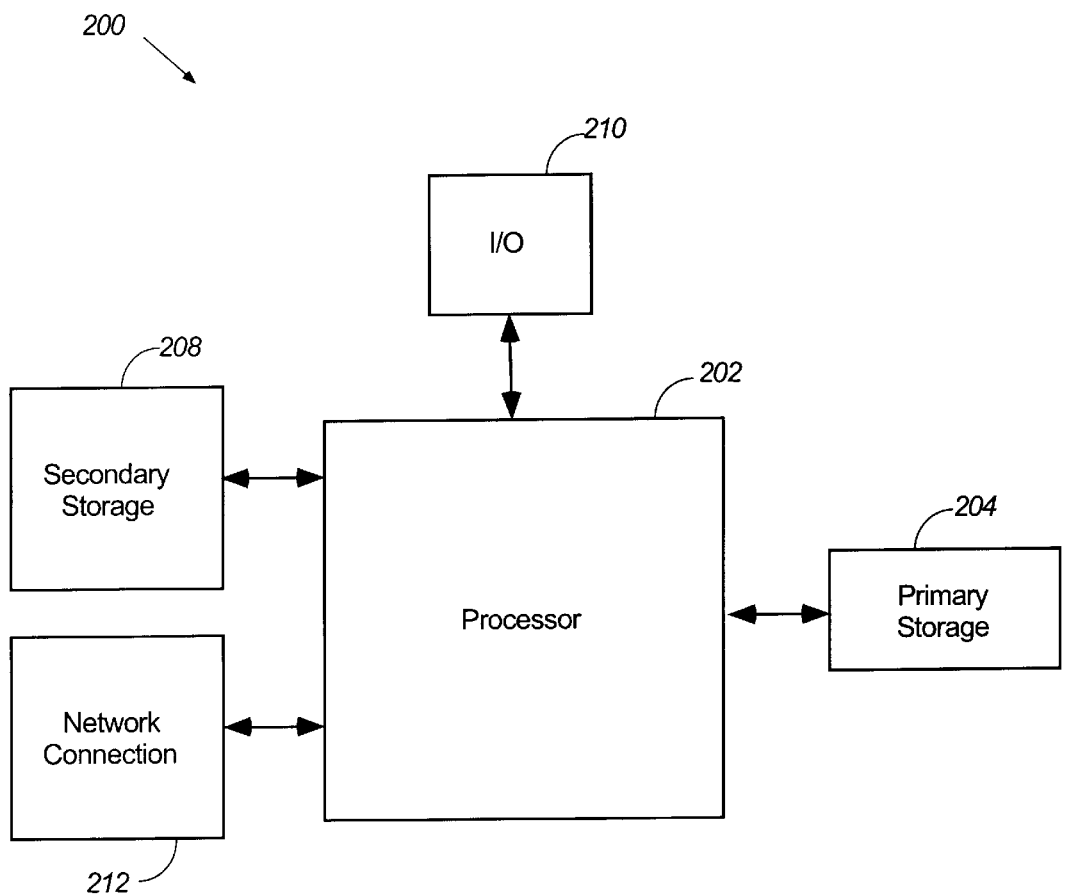
FIG. 3 is a schematic illustration of a computer system in accordance with the present invention.

Computers 102, 106, 108, 110, and 112 are illustrated schematically with respect to FIG. 3 at 200. Each computer includes a processing unit 202 effective for performing computations, such as, but not limited to, a central processing unit (CPU), or multiple processors including parallel processors or distributed processors. Processor 202 is coupled with primary memory 204 such as random access memory (RAM) and read only memory. Typically, RAM includes programming instructions and data, including distributed objects and their associated data and instructions, for processes currently operating on processor 202. ROM typically includes basic operating instructions, data and objects used by the computer to perform its functions. In addition, a secondary storage device 208, such as a hard disk, CD ROM, magneto-optical (floptical) drive, tape drive or the like, is coupled bidirectionally with processor 202. Secondary storage device 208 generally includes additional programming instructions, data and objects that typically are not in active use by the processor, although the address space may be accessed by the processor, e.g., for virtual memory or the like. Each of the above described computers further includes an input/output source 210 that typically includes input media such as a keyboard, pointer devices (e.g., a mouse or stylus) and the like. Each computer can also include a network connection 212. Additional mass storage devices (not shown) may also be connected to CPU 202 through network connection 212. It will be appreciated by those skilled in the art that the above described hardware and software elements, as well as networking devices, are of standard design and construction (see, e.g., Herzog 1996).

The computer-implemented methods described herein can be implemented using techniques and apparatus well-known in the computer science arts for executing computer program instructions on computer systems. As used herein, the term "computer system" is defined to include a processing device (such as a central processing unit, CPU) for processing data and instructions that is coupled with one or more data storage devices for exchanging data and instructions with the processing unit, including, but not limited to, RAM, ROM, CD-ROM, hard disks, and the like. The data storage devices can be dedicated, i.e., coupled directly with the processing unit, or remote, i.e., coupled with the processing unit, over a computer network. It will be appreciated that remote data storage devices coupled to a processing unit over a computer network can be capable of sending program instructions to a processing unit for execution on a particular workstation. In addition, the processing device can be coupled with one or more additional processing devices, either through the same physical structure (e.g., in a parallel processor), or over a computer network (e.g., a distributed processor.). The use of such remotely coupled data storage devices and processors will be familiar to those of skill in the computer science arts (see, e.g., Ralston 1993). The term "computer network" as used herein is defined to include a set of communications channels interconnecting a set of computer systems that can communicate with each other. The communications channels can include transmission media such as, but not limited to, twisted pair wires, coaxial cable, optical fibers, satellite links, or digital microwave radio. The computer systems can be distributed over large, or "wide" areas (e.g., over tens, hundreds, or thousands of miles. WAN), or local area networks (e.g., over several feet to hundreds of feet, LAN). Furthermore, various local- and wide-area networks can be combined to form aggregate networks of computer systems. One example of such a confederation of computer networks is the "Internet".

3. The Composition Tool of the Invention

Figure 4:
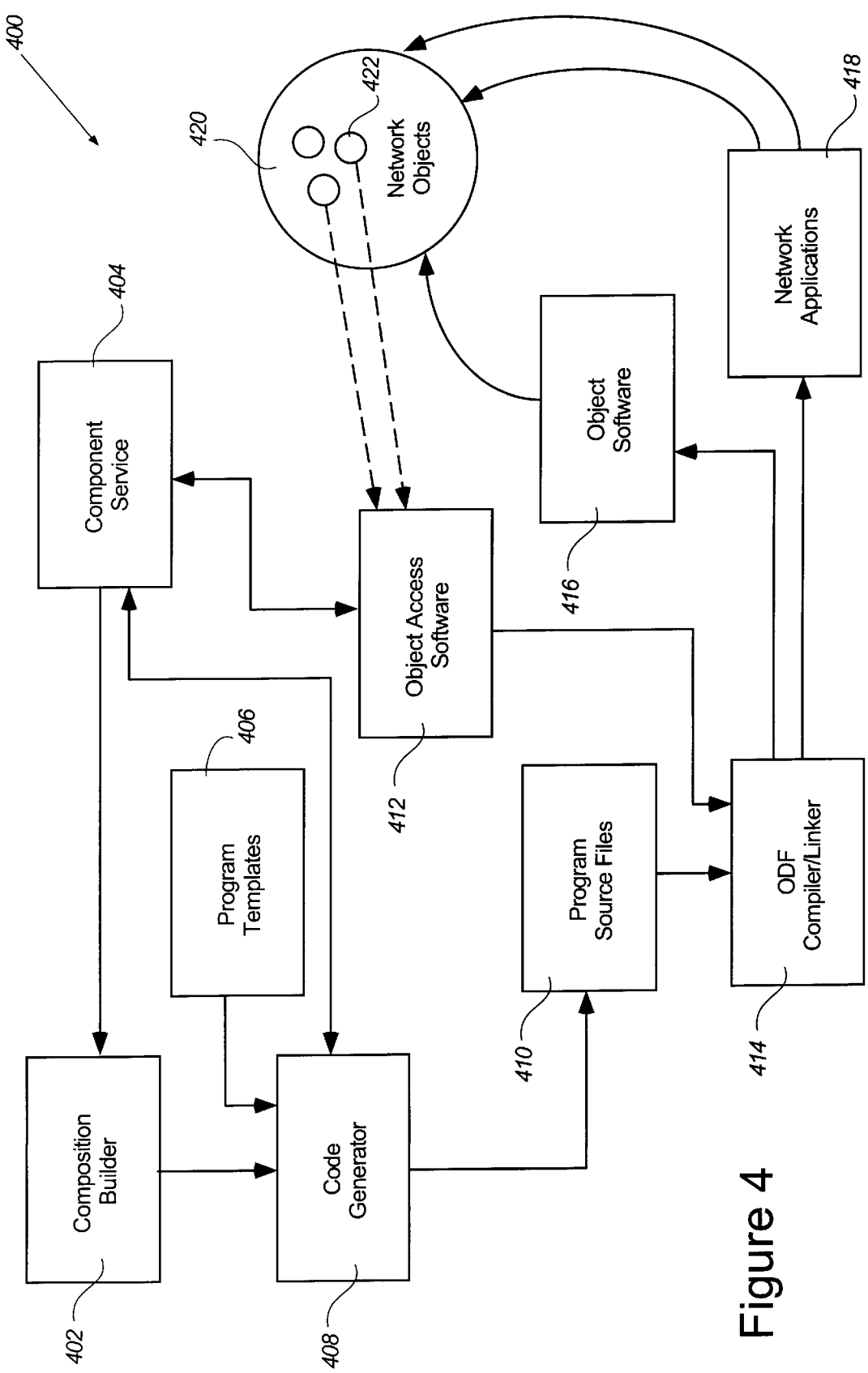
FIG. 4 is a schematic illustration of a system for constructing object-oriented applications in a distributed object system in accordance with the present invention.

FIG. 4 at 400 illustrates schematically a system for composing object-oriented applications in a distributed object system. The system of the invention includes a composition builder 402 which the user, typically a programmer, employs to compose applications for installation on the distributed object system such as that shown in FIG. 3 and described above. The composition builder is coupled with a component service 404 that provides the user or programmer access to objects available on the distributed object system. In one embodiment, such access is provided through the use of a catalogue as described in copending U.S. patent application Ser. No. 08/674,828, filed on even date herewith and incorporated herein by reference for all purposes. In brief, the catalogue is an inventory of the software resources available to the programmer on the distributed object system. In one embodiment, the catalogue provides information to the programmer regarding the function and implementation of the objects referenced by the components contained in the catalogue. Thus it will be seen that the catalogue promotes collaboration across the distributed object system by making software assets available to the user and promotes cooperation among software developers by giving them detailed information about the objects and software that are available for their use. Composition builder 402 is further coupled to a code generator 408 which, in conjunction with program template repository 406 takes the composition created by the composition builder and produces program source files as shown at 410. Code generator 408 is described in greater detail in copending U.S. patent application Ser. No. 08/675,563, filed on even date herewith and incorporated herein by reference for all purposes.

Programs source files 410 are then forwarded to ODF compiler/linker 414 which is described in the above-incorporated U.S. patent application Ser. No. 08/414,240. In addition, ODF compiler/linker 414 is coupled with object access software 412 which object access software is coupled with component service 404. Object access software 412 comprises a set of stubs that are produced when an IDL compiler is used to prepare a language mapping for an IDL interface in accordance with OMG CORBA specifications for the construction of distributed objects. ODF compiler linker 414 produces both object software 416 and network software 418 which in turn accesses network objects 422 as shown generally at 420. These network objects are then employed using the object access software 414, which was supplied to the ODF compiler/linker 414 by component service 404.

In one aspect, the present invention includes a composition builder user interface which facilitates the above-described goals of increasing code reuse and programmer productivity by providing the programmer or user a highly intuitive and convenient environment in which software applications comprising at least one pre-existing object, or derivative thereof, can be composed for deployment in a distributed object system. According to one embodiment of the present invention, the composition builder interface includes several views which are designed to facilitate reuse of existing code and simplify the design of object-oriented software. A first view is shown at 500 in FIG. 5. This view illustrates a composition design environment comprising a window 501 which window includes a title bar 502, and a control region 503 Control region 503 includes a plurality of interface mode control buttons 504 and build and compilation control buttons 505 and 506.

An interface tool region 507 includes a display of available interfaces which display includes a current interface region 508, in which an icon representing the interface currently being manipulated (e.g., the interface entitled, "AudioApp" 509), is displayed in addition to other icons representing pre-defined interfaces from which the current interface is being derived are shown generally at 510 (the interfaces "App" and "Stream" respectively). A user interface control button 511 is shown which, when activated, activates an editor for reviewing and developing the user interface for the particular application being developed. Such utilities for creating and editing user interfaces are known to those of skill in the computer science arts.

A value editing region shown generally at 512 allows the programmer to control various parameters within parts that are being manipulated during the development process. Display 512 includes a first region 514 which indicates the particular part being manipulated (here, the object, "AudioDev" 530), a field for the particular property being edited (here, the property "Volume"), and the value field 518 which displays the value of the particular property being examined (here, the value of the property Volume is set to "10.0").

The editor 500 further includes a region 520 in which sockets being provided for the interface of the application being composed, such as "Socket_1" 522, are shown and can be edited. Correspondingly, a second field 524 illustrates the plugs provided by the application, such as "Plug_1" 526. In the central portion 525, also referred to herein as a "worksheet", parts corresponding to various pre-existing objects are arranged and connected graphically to define code for the implementation of the application being composed. Shown in the worksheet are two parts representing pre-existing objects: AudioDev 530, and Input Stream 532. Part 530 is connected to Socket_1 by a connection 534 and is further connected to Input Stream part 532 by a connection 536. Also connected to Input Stream 532 is the interface Stream 540 and Plug_1 526 by connection 538.

Figure 5:
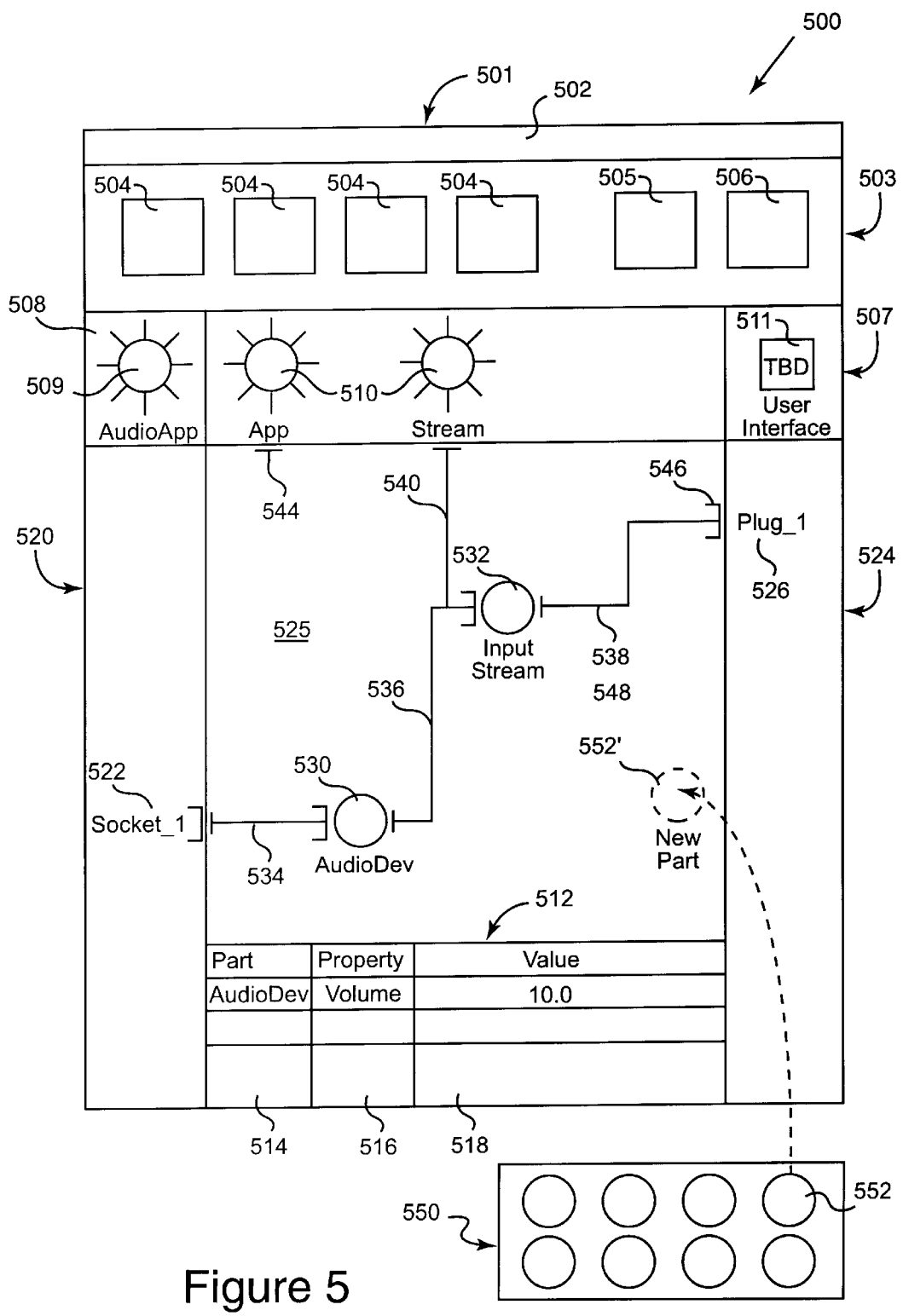
FIG. 5 is an illustration of a composition builder in accordance with the present invention.

The connections between parts and other parts or interfaces is made using plugs such as shown at 544, and sockets such as shown at 546. As discussed in co-pending U.S. patent application Ser. No. 08/675,094 filed on even date herewith and incorporated herein by reference for all purposes, a socket is a representation of a service provided by an object, comprising usually an object reference that is passed by that object to another requesting object. A plug, conversely, is a service that an object is capable of requesting and processing. As will be known to those of skill in the object programming arts, objects communicate amongst themselves by passing and operating upon object references which communication is represented schematically by drawing connections (such as connection 536) between the plug of a first object and a socket of a second object. As will be apparent from the interface illustrated in FIG. 5, the present invention facilitates the construction of applications by taking advantage of the above-described programming object connection paradigm by providing a graphical environment in which icons representing objects (i.e., parts) are connected by using interactive tools to define connections between plugs and sockets. Also illustrated in FIG. 5 is a component catalog which is shown generally at 550, which catalog contains components such as shown at 552. The component catalog is described in greater detail in copending U.S. patent application Ser. No. 08/674,828, filed on even date herewith and which is incorporated herein by reference for all purposes.

According to one embodiment of the present invention, upon selecting a component, such as component 552 of component catalog 550, and dragging the component from the component catalog into the worksheet, the component is transformed into a corresponding part 552'. As described above, a part is a "placeholder" for an instance of the object type which the part and component both reference. The part indicates the plugs and sockets available from the corresponding object. By connecting the plugs and sockets between the parts located in the worksheet, such as part 552', the composition builder of the present invention is able to generate corresponding code for establishing the necessary connections among the parts thus relieving the programmer of the laborious task of locating the appropriate objects across the distributed object system, providing the necessary boilerplate code for accessing those objects, and determining the appropriate arguments in syntax necessary to establish communications among those objects. Thus, it will be appreciated that the composition builder facilitates the construction of applications to be installed in distributed object systems by providing a simpler way of accessing and reusing code that is available throughout the distributed object system and implementing that code by providing an intuitive framework for composing an application. In addition, it will be apparent from the illustration that the overall architecture of the code, e.g. the interconnections between the objects, is presented to the programmer in a highly natural and intuitive fashion. Thus, by examining the worksheet, a programmer can readily identify the relationships among the objects which comprise the current composition so that the design of the code can be quickly and readily evaluated and modified if necessary. Thus, the composition worksheet of the present invention will also be recognized to facilitate the design of applications as well as their implementation.

Figure 6:
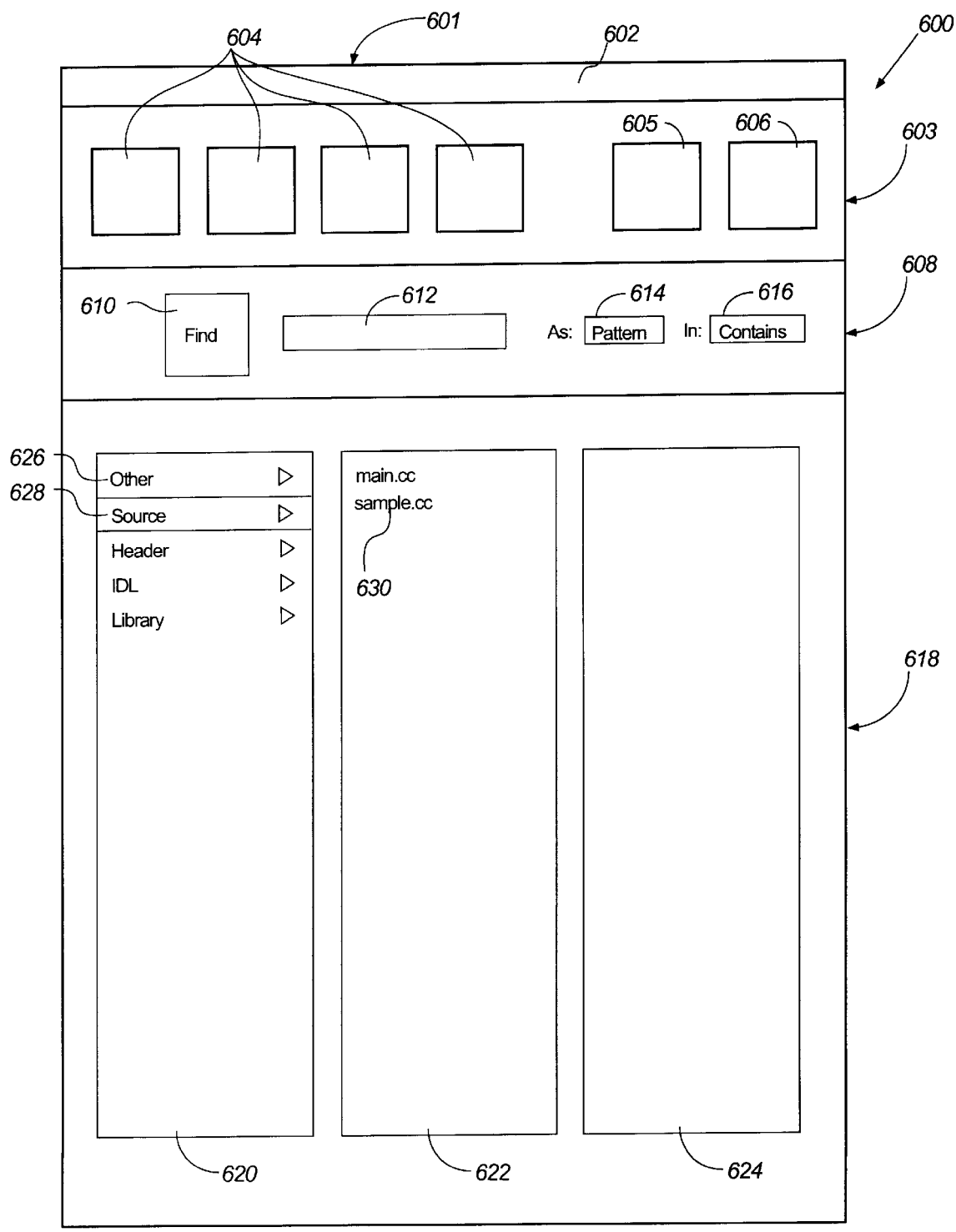
FIG. 6 is an illustration of a file browser in accordance with the present invention.

In a second aspect, the composition builder of the present invention provides a second interface which, in one embodiment, is accessible by activating one of the above described buttons 504. In this second aspect, the composition builder includes a file browsing utility such as shown in FIG. 6 at 600. It will be appreciated by those of skill in the computer programming arts that file browsing utility 600 facilitates the construction of object applications by providing the programmer a relatively concise view of the files (e.g., program source files and executable code libraries) which constitute the program being constructed. In one embodiment, the display is maintained by composition builder 402 and a client of component service 404 such that an inventory of all object access software (412) required for using the parts and inherited interfaces being referenced and manipulated by the composition being constructed is maintained.

As shown at 600, in one embodiment the browser comprises a window 601 which window, in one embodiment, includes a title bar 602, a control region 603, which is substantially identical to control region 503 of worksheet 500, and a file search/navigation region 608. The search and navigation region comprises, in one embodiment, a find button 610 which, when depressed, provides the user with a means of identifying file and object characteristics that can be searched using search engines such as those well known in the computer science arts for searching objects and files based on a variety of characteristics (e.g. text strings). Next to Find 610 is a window 612 for entering information for imputing into the file search engine. Pattern window file 614 and contains window 616 both allow these to enter additional attributes to perform the searching function that is initiated upon activating find button 610. Region 618 of window 600 includes in the illustrative embodiment three columns 620, 622, and 624 for displaying various files in a hierarchical display. In one embodiment, files that are at a more general end of a file tree structure are displayed on the left hand side in column 620. Such files may include other, shown at 626, or source, shown at 628 which is illustrated as having been selected by the parallel lines arranged above and below the label, shown at 628. If files are contained within the source directory, these files are listed in column 622 as shown, for example, by the file "sample.cc" 630. Where a subdirectory available within the higher level directory the subdirectory would appear in column 622 in a format substantially identical to those shown in 620. Selecting the subdirectory, (not shown) would cause a display of files and subdirectories located in the selected subdirectory to appear in column 624. As will be familiar to those of skill in the art, were additional subdirectories displayed in column 624 selection of one of those additional directories would cause a redistribution of the columns so that entries in column 620 would be replaced by those in column 622, the entries in 623 would be displayed in column 622, and the entries in the subdirectory originally provided in 624 would be displayed in column 624.

Figure 7:
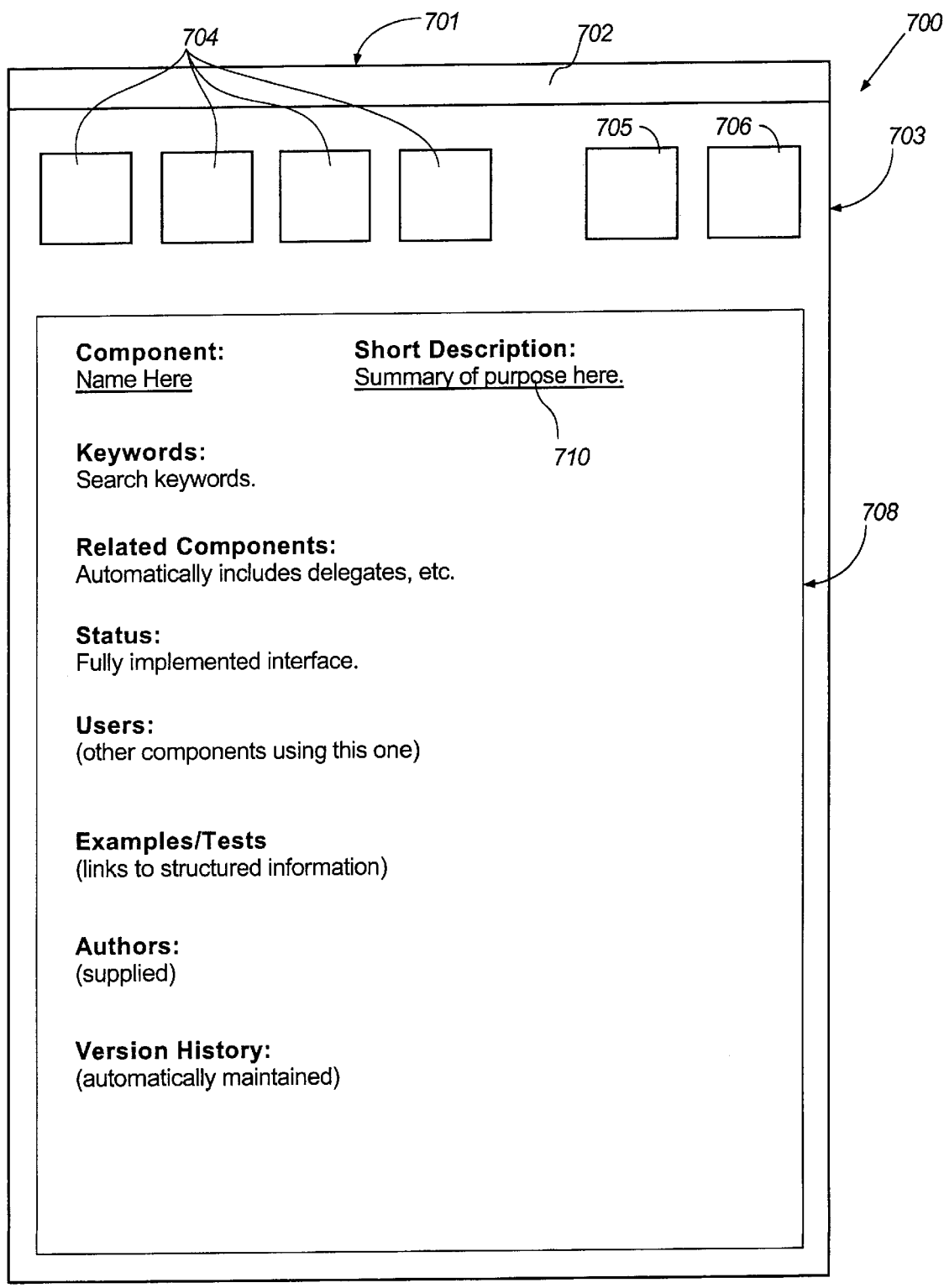
FIG. 7 is an illustration of a component summary sheet and editor in accordance with the present invention.

In still another aspect of the composition builder interface of the present invention, the present invention provides a third interface for entering information pertaining to the particular component or part that has been selected. As shown at 700 in FIG. 7, one embodiment includes a window 701 which comprises a title bar 702 and a control region 703 having buttons 704, 705, and 706 which perform functions substantially identical to those described with respect to FIGS. 5 and 6 above. In display region 708, various information that is relevant to identifying and describing an object referenced by a particular part or component is provided so that the programmer can describe the nature of the referenced object so that other users of the catalog can determine the nature and properties of the object being composed for inclusion of that object in other compositions.

Such information may include items such as the name of the component, various key words which can be search, e.g., using browser 600, various related components, to the selected component or part, various related components to the selected component or part, the status of the object referenced by the component or part, various components that are currently using the selected component or part, examples or tests which define links to various structured information concerning the object being referenced, the identities and locations of the author(s) as well as the version history. Furthermore, a short description of the purpose and function can be provided such as shown at 710. Thus, it will be appreciated that this interface provides the programmer with a relatively straightforward means for providing relevant information to facilitate the reuse of objects already implemented in the distributed object system.

In still another aspect, the composition builder of the invention includes an editor for modifying various interfaces for use with the application being composed. One example of such an editor is shown at 800 in FIG. 8. The interface editor comprises a window 801 which, in one embodiment, includes a title bar 802, and a control region 803 which includes button 804, 805 and 806 having functions substantially identical to those described above with respect to FIG. 5. An editing port 808 is included into which text can be entered to define and edit interfaces in addition to receiving messages from an associated compiler, such as an IDL compiler. In one embodiment, the editor is a standard text editor for editing both IDL code and object code, such as C++.

The above-described interfaces can be constructed using software and techniques known to those of skill in the computer science arts, and, more particularly, in the computer interface arts. Software from which the above-described interfaces can be constructed includes, but is not limited to, OpenStep (available from Sun Microsystems of Mountain View, Calif.), Windows (available from Microsoft Corporation of Redmond, Wash.), the Macintosh operating system (available from Apple Computer of Cupertino, Calif.), and X Windows (available from X Consortium of Cambridge, Mass.). It will be appreciated that a variety of changes can made to the above-described implementations without departing from the invention.

Figure 9:
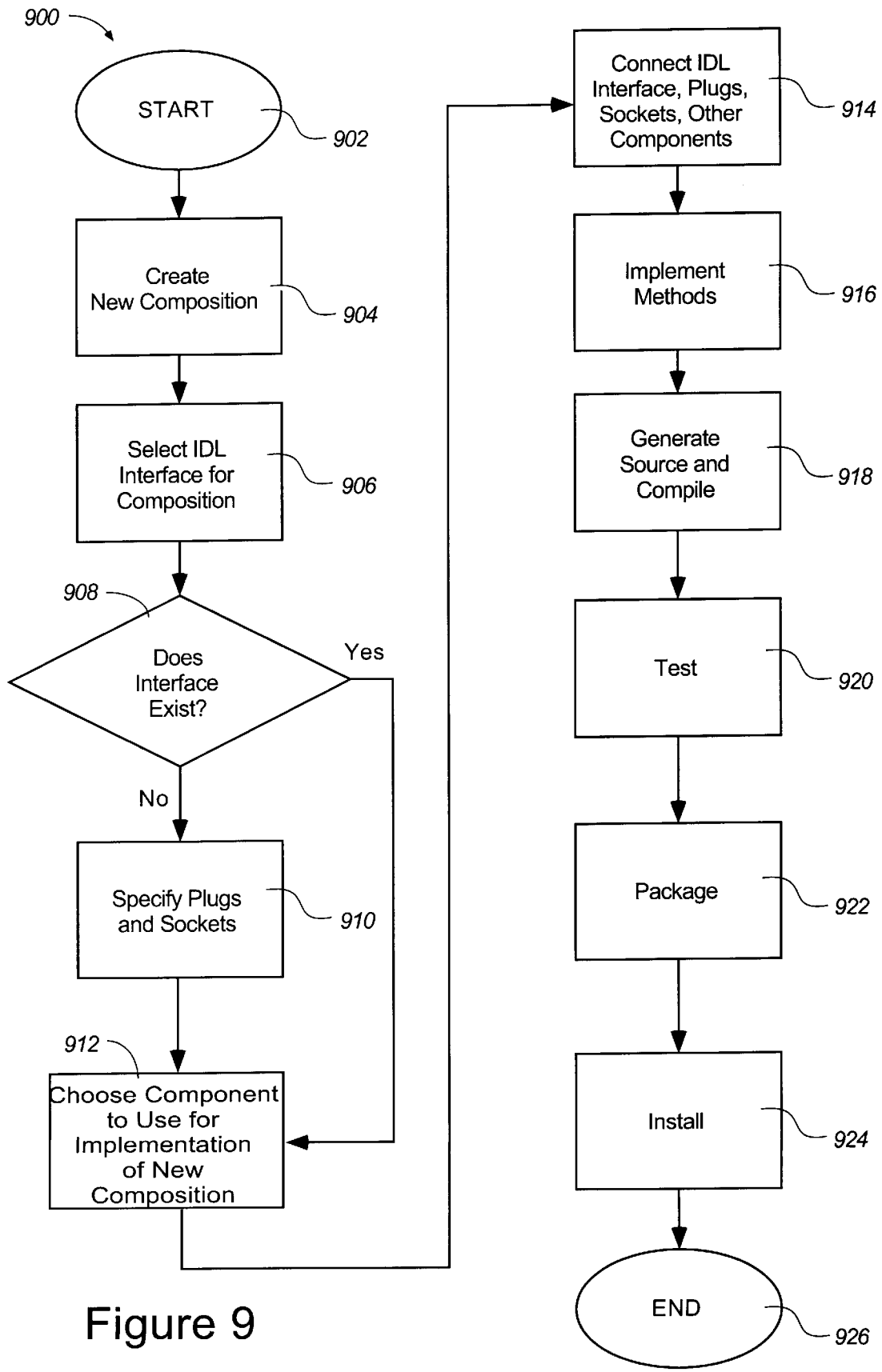
FIG. 9 is an illustration of a method for composing object-oriented applications for deployment on a distributed object system in accordance with the present invention.

Having described on embodiment of the composition builder and an associated interface, we now turn to the construction of applications using the composition builder described herein. One such method is illustrated at 900 in FIG. 9. Beginning at 902 a new composition is created at 904. At 906 an interface is selected for the composition, such as IDL implemented interface which defines the services provided and information required for the application being constructed. At 908 a determination is made as to whether an interface already exists for the object. If no such interface exists, then the plugs and sockets necessary for the application being created to communicate with other objects on the distributed object system are provided at step 910 using the composition builders worksheet 500 as described above, and in particular, areas 520 and 524 of worksheet 500. If an interface already exists, or when the plugs and sockets for the new interface have been defined at 910, at 912, the components to be used in the implementation of the new composition (i.e. the application being developed), are chosen. In one embodiment, these components are chosen from the catalogue 550 and comprised components 552 as displayed therein.

Figure 8:
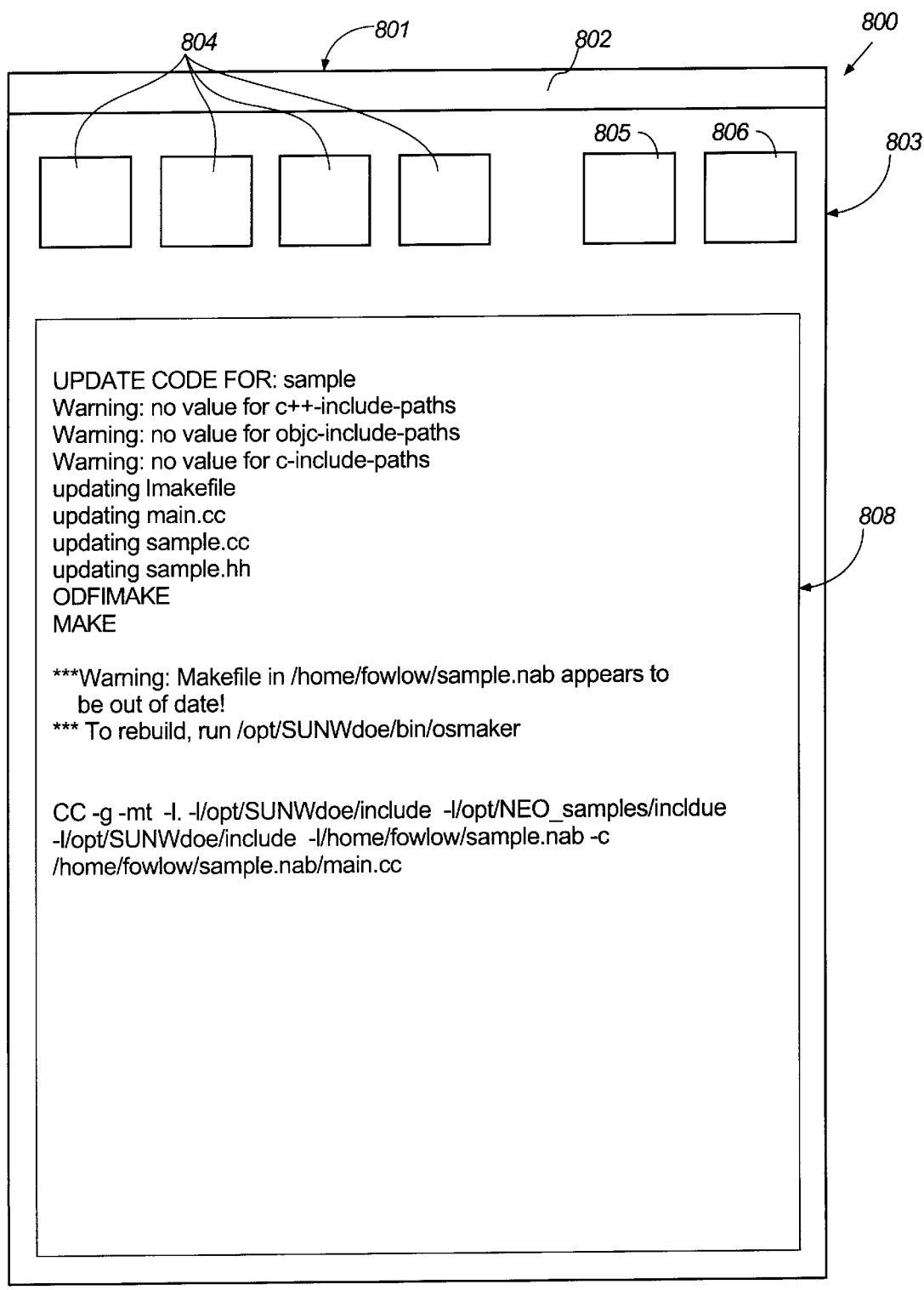
FIG. 8 is an illustration of an interface definition language (IDL) editor in accordance with the present invention.

As described above, upon selecting icons representing the components, such as component 552, the programmer is displayed with certain information relating to the components as described in co-pending U.S. patent application Ser. No. 08/674,828 previously incorporated herein by reference. At step 914, the various IDL interfaces, plugs, and other components of the parts placed into the worksheet area 525 are connected using connections such as shown at 534, 536, 538, and 540 of FIG. 5. At step 916, the methods by which the related objects will function are implemented. In one embodiment, these implementations are defined using a text editor such as shown in FIG. 8 at 800. Following the implementation, the source code is generated and compiled using code generator 408 which code generator and which building and generating is described in greater detail in the above-referenced, copending U.S. patent application Ser. No. 08/675,563. Once the source has been generated and compiled at step 920 testing can be performed in order to perform any necessary debugging of the generated code, and at steps 922 and 924 the finished code is packaged and installed. In one embodiment, steps 920 through 924 are performed in connection with the object development facility (ODF) such as shown at 414 of FIG. 4 and which is described in the above-referenced, copending U.S. patent application Ser. No. 08/414,240.

Figure 10:
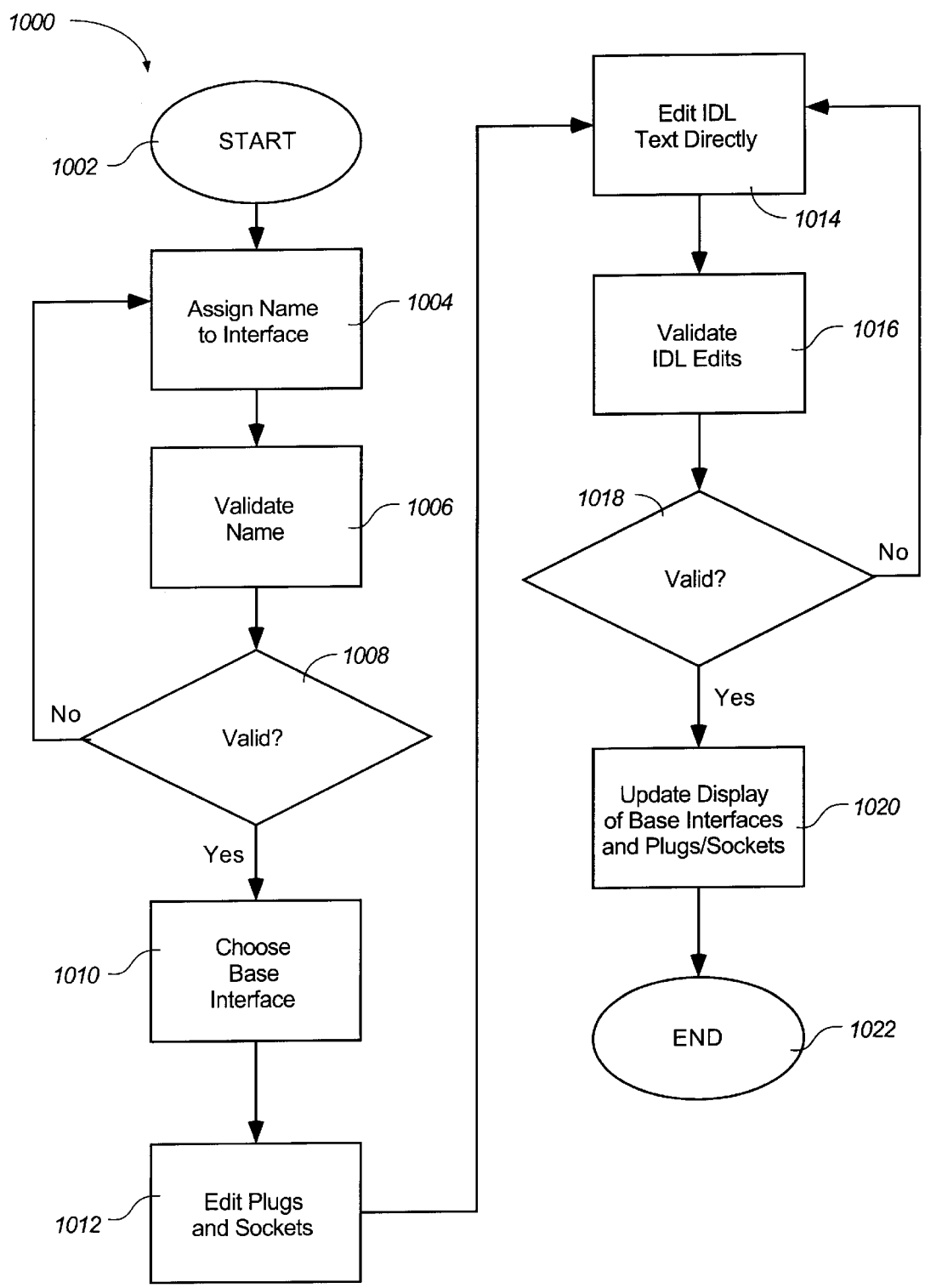
FIG. 10 is an illustration of the construction of an object interface in accordance with the present invention.

FIG. 10 illustrates a method for constructing new interfaces at 1000. Beginning at 1002, a name is first assigned to a new interface at 1004 and, and at step 1006, the name is validated using standard methods to compare the syntax of the supplied name against the criteria for a valid interface name. At step 1008, a determination is made as to whether the supplied name is valid. If the name is not valid, then control returns to step 1004 where a new name needs to be supplied or the original name needs to be modified. Typically, such return of flow control will coincide with a warning being displayed to the programmer. Once a valid name is supplied at 1008 a user can choose one or more base interfaces at 1010; however, the user is not required to choose any base interfaces. Base interfaces should be chosen which provide the closest approximation to the interface desired for the application being composed. At 1012, plugs and sockets are edited using the interface shown at 500 in FIG. 5 and in conjunction with associated interfaces 600, 700, and 800 as described above.

At step 1014, the programmer may wish to enter IDL text directly in those cases in which interfaces are defined using the Interface Definition Language. Such editing is performed, in one embodiment, using the editor shown at 800 in FIG. 8. At step 1016 any edits are validated using, e.g., an IDL compiler and any results are displayed to the user. If the edits are valid then, at 1018 the display of base interfaces and associated plugs and sockets is updated at step 1020 using the method and apparatus described in the above-incorporated, co-pending U.S. patent application Ser. No. 08/675,094; otherwise, further editing is performed at step 1014. Typically, if the edits are not valid, the user will be presented with various debugging messages such as shown in FIG. 8. Following the update of the plugs and sockets at step 1020, the editing operations are concluded at step 1022.

Figure 11:
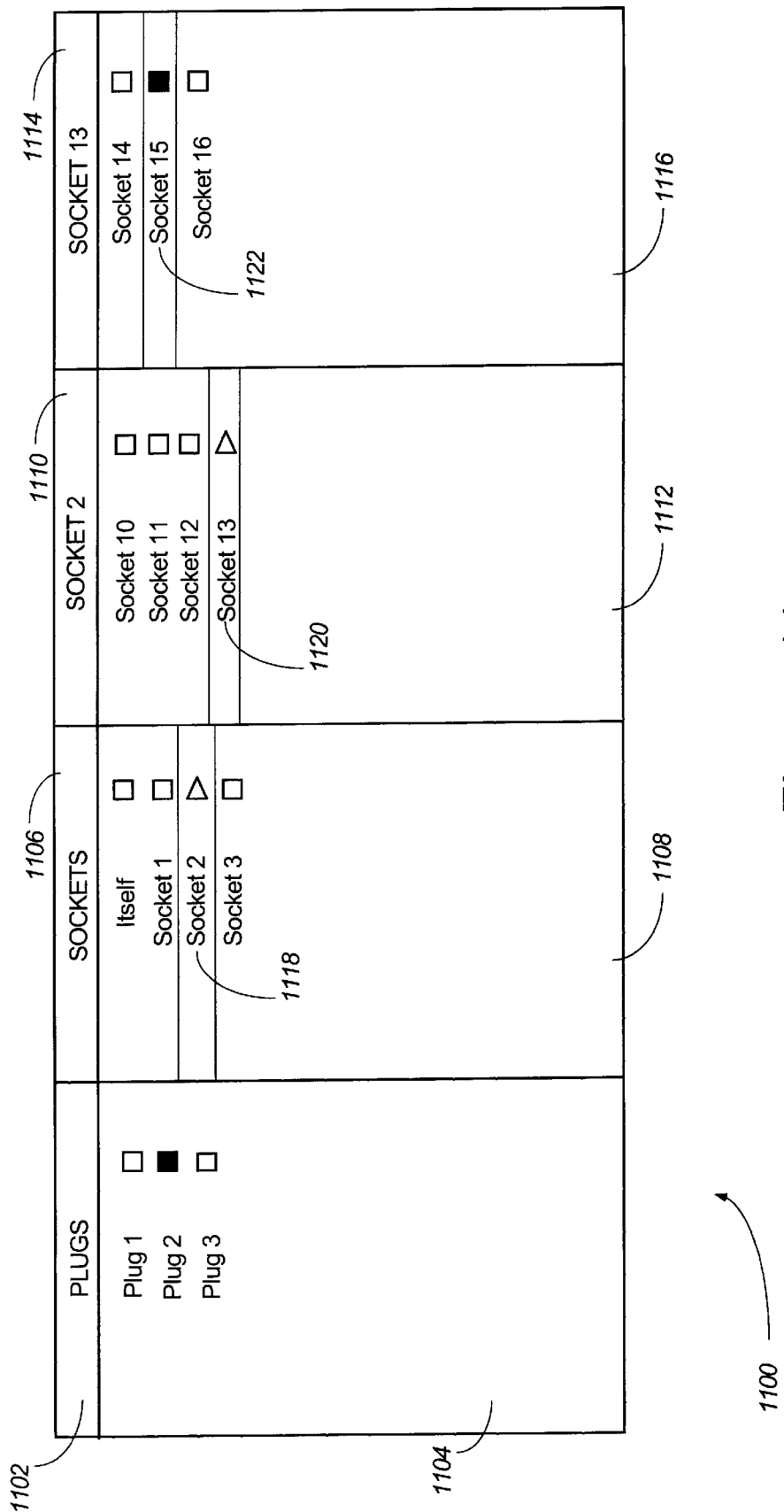
FIG. 11 is an illustration of a browsing utility for defining connections between plugs and sockets in accordance with the present invention.

In one embodiment, the connections between the plugs and sockets are determined using a browser such as that shown at 1100 in FIG. 11. Browser 1100 includes various fields including one for plugs such as shown at 1102 and various fields for sockets such as shown at 1106, 1110, and 1114. Upon choosing a particular plug, e.g., Plug 2 in field 1104, the sockets capable of being associated with that plug are displayed in field 1108. As described above with respect to the browser shown at 600 in FIG. 5, is the sockets themselves are related to additional sockets, fields 1112 and 1116 will be populated with the related sockets for the particular socket that is selected such as shown. In the Figures shown, for example, Socket 2 is selected at 1118 and related Socket 13 as selected at 1120 thus providing the user with the display of Sockets 14, 15, and 16 in field 1116. Selection of Socket 15 as shown at 1122 indicates that Plug 2 has been linked to Socket 15.

Although the foregoing invention has been described in some detail for purposes of clarity of understanding, it will be apparent that certain changes and modifications may be practiced within the scope of the appended claims. For instance, although the specification has described certain interface designs, other interface designs can be used as well. For example, one or more of the control buttons or input fields described above in FIGS. 6–8 can be omitted without departing from the scope or spirit of the invention. In addition, various ways of specifying connections among objects can be incorporated into the interface designs described herein. For example, objects other than parts and/or components can be used to represent pre-existing distributed objects.

The following materials are incorporated herein by reference in their entirety and for all purposes.
1. Ralston, Anthony, and Reilly, Edwin D. 1993. *Encyclopedia of Computer Science.* Van Norstrand Reinhold.
2. Herzog, James H. 1996. *Design and Organization of Computing Structures.* Franklin, Beedle & Associates, Inc.
3. Stone, Harold S. 1983. *Microcomputer Interfacing.* Addison Wesley.
4. Martin, James, and Chapman, Kathleen K. 1989. *Local Area Networks: Architectures and Implementations.* Prentice Hall.
5. Ben-Natan, Ron. 1995. *CORBA A Guide to Common Object Request Broker Architecture.* M$^c$Graw-Hill.

What is claimed is:

1. A computer-implemented method for constructing object-oriented application software to be installed on a distributed object system, which object-oriented application software includes an application program interface and at least one pre-existing object or derivative of a pre-existing object, the method comprising:

providing a catalog facility which contains references to pre-existing object implementations provided on a distributed object system;

providing an application construction environment in which said references can be linked to define relationships thereamong to provide thereby computer code for said object-oriented application software, said application construction environment including facilities for selecting and defining links among said references;

selecting a reference for inclusion in said application software from said catalog facility;

making said reference to said pre-existing object available to said application construction environment;

linking said reference to at least one other reference in said application construction environment to define thereby a relationship between said references such that computer code effective to implement said relationship is generated when said application program is run, wherein said linking comprises defining at least one connection between a first part and a second part or a reference to an interface;

wherein said references to said pre-existing objects comprise icons, said catalog facility and said application construction environment comprise graphical user interfaces, said selecting comprises making a selection action on one of said icons, said making of said reference to said pre-existing object available to said application construction environment comprises dragging said reference to from said catalog facility to said application construction facility, and wherein said reference is a component, generating a part from said component when said component is dragged from said catalog into said application construction environment.

2. The method of claim 1, wherein said first and second parts each comprise plugs and sockets and said linking comprises defining a connection between a plug on said first part and a socket on said second part.

3. A computer-implemented method for constructing object-oriented application software to be installed on a distributed object system, which object-oriented application software includes an application program interface and at least one pre-existing object or derivative of a pre-existing object, the method comprising:

providing a catalog facility which contains references to pre-existing object implementations provided on a distributed object system;

providing an application construction environment in which said references can be linked to define relationships thereamong to provide thereby computer code for said object-oriented application software, said application construction environment including facilities for selecting and defining links among said references;

selecting a reference for inclusion in said application software from said catalog facility;

making said reference to said pre-existing object available to said application construction environment;

linking said reference to at least one other reference in said application construction environment to define thereby a relationship between said references such that computer code effective to implement said relationship is generated when said application program is run; and wherein said pre-existing object includes an interface, editing said interface to define thereby a new interface; and editing the source code of said pre-existing object to define thereby a new object implementation.

4. A computer-implemented method for constructing object-oriented application software to be installed on a distributed object system, which object-oriented application software includes an application program interface and at least one pre-existing object or derivative of a pre-existing object, the method comprising:

providing a catalog facility which contains components that provide references to pre-existing objects provided on a distributed object system;

selecting a component for inclusion in said application software from said catalog facility and deriving a part from said component;

making said part available to an application construction environment in which said part can be linked to at least one other part referencing a pre-existing object in said distributed object system to define relationships thereamong to provide thereby computer code for said object-oriented application software, said application construction environment including facilities for selecting and defining links among said parts; and linking said part to at least one other part in said application construction environment to define thereby a relationship among said parts such that computer code effective to implement said relationship is generated when said application program is run; and wherein said each of said parts each comprises plugs and sockets and said linking comprises defining a connection between a plug on a first part and a socket on a second part.

5. The method of claim 4, wherein said catalog facility includes regions for viewing said icons and information regarding the pre-existing object represented by said icons, and said selecting said component is effective to cause the display of information relating to said at least one pre-existing object.

6. A computer-implemented method for constructing object-oriented application software to be installed on a distributed object system, which object-oriented application software includes an application program interface and at least one pre-existing object or derivative of a pre-existing object, the method comprising:

providing a catalog facility which contains components that provide references to pre-existing objects provided on a distributed object system;

selecting a component for inclusion in said application software from said catalog facility and deriving a part from said component;

making said part available to an application construction environment in which said part can be linked to at least one other part referencing a pre-existing object in said distributed object system to define relationships thereamong to provide thereby computer code for said object-oriented application software, said application construction environment including facilities for selecting and defining links among said parts; and linking said part to at least one other part in said application construction environment to define thereby a relationship among said parts such that computer code effective to implement said relationship is generated when said application program is run; and wherein said part includes a reference to the interface of the pre-existing object referred to by said part, and editing said interface to define thereby a new interface; and editing the source code of said pre-existing object to define thereby a new object implementation.

7. A computer system for constructing under computer control object-oriented application software to be installed on a distributed object system, which object-oriented application software includes an application program interface and at least one pre-existing object or derivative of a pre-existing object, the system comprising:

a component service which includes a catalog of references to pre-existing objects installed on said distributed object system; said component service being coupled with a composition builder for generating compositions using said references, which composition builder provides an application construction environment in which said references can be linked to define relationships thereamong to provide thereby computer code for said object-oriented application software, said application construction environment including facilities for selecting and defining links among said references; said composition builder being coupled with a code generation unit for generating and compiling source code from said compositions to generate thereby program source files; said code generation unit being coupled with an object development facility which said processes program source files generated by said code generation unit to produce software objects for installation on said distributed object system, and wherein said catalog of references comprises components, said components being effective to define properties of the object being referenced, said properties including the type of object being referenced by the component, the services provided by said object being referenced by said component, the implementation of said object being referenced by said component, and a name by which said implementation can be accessed on said distributed object system.

8. The system of claim 7, wherein said system further includes a selection mechanism for identifying components to be included in said composition builder and said composition builder includes a transformation mechanism to transform said component reference into a part reference, said part reference being a surrogate for said pre-existing object being referenced by said component.

9. The system of claim 8, wherein said part comprises plugs and sockets and said facilities for selecting and defining links among said references includes means for defining links between plugs and sockets.

10. A computer system for constructing under computer control object-oriented application software to be installed on a distributed object system, which object-oriented application software includes an application program interface and at least one pre-existing object or derivative of a pre-existing object, the system comprising:

a component service which includes a catalog of references to pre-exisitng objects installed on said distributed object system; said component service being coupled with a composition builder for generating compositions using said references, which composition builder provides an application construction environment in which said references can be linked to define relationships thereamong to provide thereby computer code for said object-oriented application software, said application construction environment including facilities for selecting and defining links among said references; said composition builder being coupled with a code generation unit for generating and compiling source code from said compositions to generate thereby program source files; said code generation unit being coupled with an object development facility which said processes program source files generated by said code generation unit to produce software objects for installation on said distributed object system, and wherein said composition builder comprises a composition workspace in which parts can be selected and linked, an interface editor for editing computer code defining the interface of a pre-existing object, a browser for selecting files to be edited, and a summary table for defining information about the object being referenced by the part.

11. The system of claim 10, wherein said composition workspace, said interface editor, said browser, and said summary table each comprise a graphical user interface.

12. The system of claim 11, wherein said graphical user interface for said composition worksheet comprises a region for displaying, selecting, and linking parts, a region for displaying and selecting the plugs of a selected part, a region for displaying and selecting the sockets of a selected part, a region for displaying the interface of the application being constructed, a region for references to the interfaces of pre-existing objects, and a region for setting attribute values of selected parts.

13. A computer system for constructing under computer control object-oriented application software to be installed on a distributed object system, which object-oriented application software includes an application program interface and at least one pre-existing object or derivative of a pre-existing object, the system comprising:

a component service which includes a catalog of references to pre-existing objects installed on said distributed object system; said component service being coupled with a composition builder for generating compositions using said references, which composition builder provides an application construction environment in which said references can be linked to define relationships thereamong to provide thereby computer code for said object-oriented application software, said application construction environment including facilities for selecting and defining links among said references; said composition builder being coupled with a code generation unit for generating and compiling source code from said compositions to generate thereby program source files; said code generation unit being coupled with an object development facility which said processes program source files generated by said code generation unit to produce software objects for installation on said distributed object system, and a repository of program templates coupled with said code generator, said code generator being coupled further with said component service, and wherein said code generator is configured to combine generated code with said source templates to produce said program source files.

14. The system of claim 13, wherein said object development facility is further coupled with a repository of object access software, said repository of object access software being coupled with a plurality of distributed objects.

15. The system of claim 14, wherein said component service is further coupled with said repository of object access software such that said component service has access to said distributed objects.

16. A computer program product for constructing object-oriented application software to be installed on a distributed object system, which object-oriented application software includes an application program interface and at least one pre-existing object or derivative of a pre-existing object, the computer program product comprising computer readable program code devices for:

providing a catalog facility which contains references to pre-existing objects provided on a distributed object system;

providing an application construction environment in which said references can be linked to define relationships thereamong to provide thereby computer code for said object-oriented application software, said application construction environment including facilities for selecting and defining links among said references;

selecting a reference for inclusion in said application software from said catalog facility;

making said reference to said pre-existing object available to said application construction environment;

linking said reference to at least one other reference in said application construction environment to define thereby a relationship between said references such that computer code effective to implement said relationship is generated when said application program is run;

wherein said references to said pre-existing objects comprise icons, said catalog facility and said application construction environment comprise graphical user interfaces, said program codes devices for selecting comprise program code devices for making a selection action on one of said icons, said program code devices for making said reference to said pre-existing object available to said application construction environment comprise program code devices for dragging said reference to from said catalog facility to said application construction facility, and wherein said reference is a component and including program code devices for generating a part from said component when said component is dragged from said catalog into said application construction environment, said program code devices for linking comprise program code devices for defining at least one connection between a first part and a second part or a reference to an interface.

17. The computer program product of claim 16, wherein said first and second parts each comprise plugs and sockets and said program code devices for linking comprises program code devices for defining a connection between a plug on said first part and a socket on said second part.

18. The computer program product of claim 17, wherein said catalog facility includes regions for viewing said icons and information regarding the pre-existing object represented by said icons, and said program code devices for selecting said reference comprise program code devices for causing the display of information relating to said at least one pre-existing object.

19. A computer program product for constructing object-oriented application software to be installed on a distributed object system, which object-oriented application software includes an application program interface and at least one pre-existing object or derivative of a pre-existing object, the computer program product comprising computer readable program code devices for:

providing a catalog facility which contains references to pre-existing objects provided on a distributed object system;

providing an application construction environment in which said references can be linked to define relationships thereamong to provide thereby computer code for said object-oriented application software, said application construction environment including facilities for selecting and defining links among said references;

selecting a reference for inclusion in said application software from said catalog facility;

making said reference to said pre-existing object available to said application construction environment;

linking said reference to at least one other reference in said application construction environment to define thereby a relationship between said references such that computer code effective to implement said relationship is generated when said application program is run; and wherein said pre-existing object includes an interface and further including program code devices for editing said interface to define thereby a new interface; and program code devices for editing the source code of said pre-existing object to define thereby a new object implementation.

20. A computer program product for constructing object-oriented application software to be installed on a distributed object system, which object-oriented application software includes an application program interface and at least one pre-existing object or derivative of a pre-existing object, the computer program product comprising computer readable program code devices for:

providing a catalog facility which contains components that provide references to pre-existing objects provided on a distributed object system;

selecting a component for inclusion in said application software from said catalog facility and deriving a part from said component;

making said part available to an application construction environment in which said part can be linked to at least one other part referencing a pre-existing object in said distributed object system to define relationships thereamong to provide thereby computer code for said object-oriented application software, said application construction environment including facilities for selecting and defining links among said parts;

linking said part to at least one other part in said application construction environment to define thereby a relationship among said parts such that computer code effective to implement said relationship is generated when said application program is run; and wherein said part includes a reference to the interface of the pre-existing object referred to by said part, and further including computer readable program code devices for editing said interface to define thereby a new interface; and editing the source code of said pre-existing object to define thereby a new object implementation.

* * * * *